United States Patent
Tzubary et al.

(10) Patent No.: US 9,898,176 B2
(45) Date of Patent: Feb. 20, 2018

(54) DEVICE, SYSTEM, AND METHOD OF COMMUNICATION

(71) Applicant: ONE SMART STAR LIMITED, Tortola (VG)

(72) Inventors: Hemy Tzubary, Yehud-Monosson (IL); Yakov Shulman, Kiryat Ono (IL)

(73) Assignee: One Smart Star Ltd., Tortola (VG)

( * ) Notice: Subject to any disclaimer, the term of this patent is extended or adjusted under 35 U.S.C. 154(b) by 31 days.

(21) Appl. No.: 14/514,404

(22) Filed: Oct. 15, 2014

(65) Prior Publication Data

US 2015/0106784 A1    Apr. 16, 2015

Related U.S. Application Data (60) Provisional application No. 61/891,429, filed on Oct. 16, 2013.

(51) Int. Cl.
*G06F 9/44* (2006.01)
*G06F 3/0484* (2013.01)
*H04L 12/58* (2006.01)

(52) U.S. Cl.
CPC ............ *G06F 3/04842* (2013.01); *G06F 8/36* (2013.01); *H04L 51/14* (2013.01); *H04L 51/046* (2013.01)

(58) Field of Classification Search
CPC ....... G06F 3/04842; G06F 8/36; H04L 51/14; H04L 51/046

USPC .......................................................... 717/109
See application file for complete search history.

(56) References Cited

U.S. PATENT DOCUMENTS

| | | | |
|---|---|---|---|
| 2008/0152231 A1* | 6/2008 | Gokturk et al. | 382/209 |
| 2013/0018927 A1* | 1/2013 | Chang | 707/805 |
| 2013/0218682 A1* | 8/2013 | Alterman et al. | 705/14.58 |

* cited by examiner

*Primary Examiner* — Anna Deng
(74) *Attorney, Agent, or Firm* — Heidi Brun Associates Ltd.

(57) ABSTRACT

A system for creating an application for a portable electronic device includes: a template selector to select an application template from a repository of application templates; a step-by-step creator module to receive user input, and to insert the user input at one or more placeholders in said application; a button inserter to insert into said application code that causes said portable electronic device to contact a third party, via a pre-defined communication method, upon user selection of a displayed button. A computerized method implementable via an application running on a portable electronic device, includes: displaying on the portable electronic device a first screen; in response to user input, displaying on the portable electronic device a second screen; wherein the first screen, the second screen, and all screens of said application comprise a user-selectable interface element that, when selected by the user, causes the portable electronic device to contact a third party via a pre-defined communication method.

12 Claims, 7 Drawing Sheets

DEVICE, SYSTEM, AND METHOD OF COMMUNICATION

CROSS-REFERENCE TO RELATED APPLICATIONS

This application claims benefit and priority from U.S. provisional patent application No. 61/891,429, filed on Oct. 16, 2013, which is hereby incorporated by reference in its entirety.

FIELD OF THE INVENTION

The present invention relates to the field of communication.

BACKGROUND

The modern age may best be characterized by the overwhelming amount of information transmitted between individuals for personal and business purposes alike. An increasing number of individuals and entities communicate increasingly frequently, exchange increasingly more data, by an increasing number of means.

It is typically important to both the business providing a service to a customer, and to the customer receiving a service from a business that a dependable and convenient communication link exist between them. Customers place a high value on receiving the products and services they have purchased from a business at the price and under the terms to which they have agreed, and businesses depend on satisfied customers to ensure their viability in a competitive market. To achieve these ends, communication between customers and businesses is paramount. Customers and business representatives must talk or correspond in writing to provide and receive information about products and services, provide and receive price quotes, negotiate and sign service agreements and resolve problems which may arise.

Figure 1:
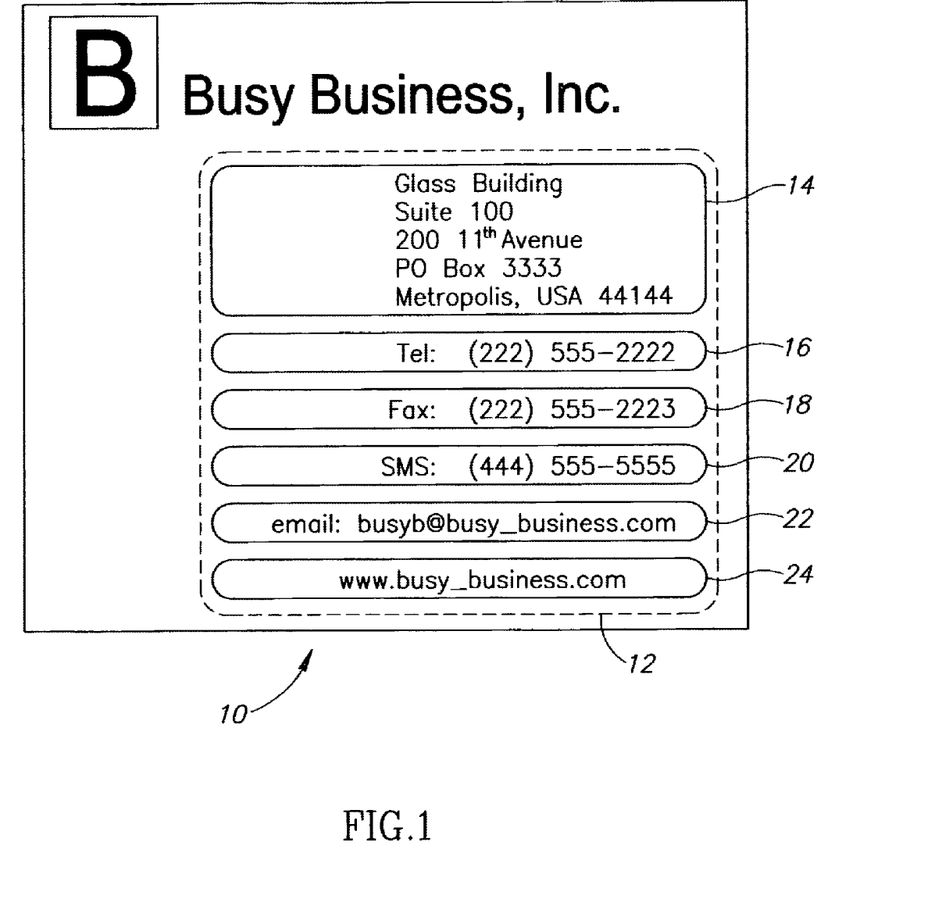
FIG. 1 is a demonstrative representation of a contemporary business card.

The typical contemporary business has kept pace with the technological advances in the field of communications which have increased and diversified the methods by which customers and businesses may communicate. This is demonstrated in FIG. 1, which shows an exemplary contemporary business card 10 for Busy Business Inc., an exemplary contemporary business. As shown in FIG. 1, the contact details 12 on business card 10 include a mailing address 14 for postal deliveries, a telephone number 16 for telephone calls, a fax number 18 for fax transmissions, an SMS number 20 for receiving text messages, an email address 22 for email transmissions, and a website address 24 for Internet access.

Both businesses and customers can benefit from the convenience afforded by the quantity and variety of communications options. For example, a customer having a busy day may find that he has missed the opportunity to call his service provider during regular business hours, but the options of contacting the business outside of office hours by fax or email remain available to him.

Ironically, as evidenced by the quantity of details shown on business card 10, it is the very increase and diversification of communication options which has itself created a communications impediment. The contemporary individual is typically overwhelmed with contact details, the majority of which he cannot hope to remember. He must be equipped at the very least with an address book, or preferably, with an electronic organizer. Keeping up with ever-increasing contact details, due to the advances of communications technology, and ever-changing contact details, due to physical relocations, area-code changes, communications service provider switches, etc. has graduated from a minor inconvenience to a more bothersome aggravation. The contemporary experience of writing a quick business email in the middle of the night which will be at its destination at the start of the next business day is a welcome one and a modern convenience. However, both unwelcome and inconvenient to a similar degree, is the "b as in boy", "d as in dog" recitation required to provide an email address over the phone accurately.

Businesses in particular cannot afford to lose touch with their customers, and historically, in recognizing that it has been in their best interest to make it easier for customers to reach them, businesses have invested considerable efforts in minimizing the cost in both time and money for customers to reach them. These efforts have included business reply mail, which saves customers the cost of a stamp when communicating with the business and toll free numbers, which save customers the cost of a telephone call when calling the business. Businesses have also used toll free numbers with the name of the business spelling out the phone number using the alphanumeric keypad to help customers easily retain and retrieve their contact information. Telephone numbers have been set to jingles and seared into our memories by constant repetition on the public airwaves. However, in the modern context, these solutions are only partial due to the increased number of the means of communication and contact details.

SUMMARY

The present invention may include, for example, a device, a system, and a method of communication.

A system for creating an application for a portable electronic device, may include: a template selector to select an application template from a repository of application templates; a step-by-step creator module to receive user input, and to insert the user input at one or more placeholders in said application; a button inserter to insert into said application code that causes said portable electronic device to contact a third party, via a pre-defined communication method, upon user selection of a displayed button.

The pre-defined communication method may comprise a communication method selected from the group consisting of: landline telephony, cellular telephony, Short Message Service (SMS), video chat, and electronic mail (email).

The button may display a compact contact detail of said third party.

The pre-defined communication method may comprise a communication method directed at said compact contact detail.

The button inserter may be operable to insert said displayed button into all screens of said application.

The system may comprise an application assembly engine to assemble said application based on said template and based on user input received by said step-by-step creator module.

The application assembly engine may generate and display at least: a control pane to receive user commands and user settings for said application being composed; and a preview pane to dynamically display a preview of said application reflecting said user commands and user setting.

The control pane may comprise one or more user interface elements selected from the group consisting of: a user interface element for receiving a user-entered text; a user interface element for receiving a user-uploaded image; a user interface element for modifying a layout of said application.

The application assembly engine may comprise: a coupon insertion module to insert to said application code which, when executed by the portable electronic device, causes the portable electronic device to display an on-screen coupon.

A computerized method implementable via an application running on a portable electronic device, may comprise: displaying on the portable electronic device a first screen; in response to user input, displaying on the portable electronic device a second screen; wherein the first screen, the second screen, and all screens of said application comprise a user-selectable interface element that, when selected by the user, causes the portable electronic device to contact a third party via a pre-defined communication method.

The pre-defined communication method may comprise a communication method selected from the group consisting of: landline telephony, cellular telephone, Short Message Service (SMS), video chat, and electronic mail (email).

The user-selectable interface element may comprise an on-screen button which displays a compact contact detail of said third party.

The method may comprise: receiving from said user a message sent via said pre-defined communication method; delivering said message to said third party; receiving from said third party a response message directed to said user; delivering said response message to said user via said pre-defined communication method.

The method may comprise: receiving from said user a message sent via said pre-defined communication method; delivering said message to said third party via another communication method.

The method may further comprise: receiving from said third party a response message directed to said user; delivering said response message to said user via said pre-defined communication method.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

In accordance with the present invention, for example, a method may comprise associating a communication nickname with a business for use with all existing types of customer communication. The method may further comprise routing (or re-routing, or instructing routers how to route, or configuring routers to re-route) each communication for the business transmitted using the communication nickname in accordance with a communication access number associated with the type of the communication.

The method may include having a compact contact detail for each type of customer communication which includes the communication nickname as a major portion thereof. The types of communication may include mail, fax, telephony, mobile or cellular telephony, short message service (SMS), text messages, Internet, electronic mail, video conference or video chat (e.g., using Wi-Fi wireless communication and/or using 3G cellular communication or 4G cellular communication or 4G LTE cellular communication), or the like; as well as postal mail, physical mail, post office mail, letters and/or packages and/or items delivered by post office or by courier, or the like.

The method may comprise providing a business with a unified communications number (or nickname, or string of characters) for all types of customer communication; and mapping the unified communications number to each address for the business issued by the communication service providers of the business. The method may comprise routing communications addressed to the unified communications number to the appropriate address, as a function of the type of communication. The unified communications number may be unique to the business.

The providing may comprise, for example, selecting a temporary unified communications number (or nickname); confirming with each of the communication service providers that the temporary unified communications number is not being used by any other business; and, if so, mapping the unified communications number between the business and the communication access numbers assigned to the business by the communication service provider(s).

Applicant has realized that the inconvenience caused by an overabundance of contact details may be overcome by taking advantage of the means by which modern communications may be routed from one communications access number to another through central routing equipment and forwarding services.

Figure 2:
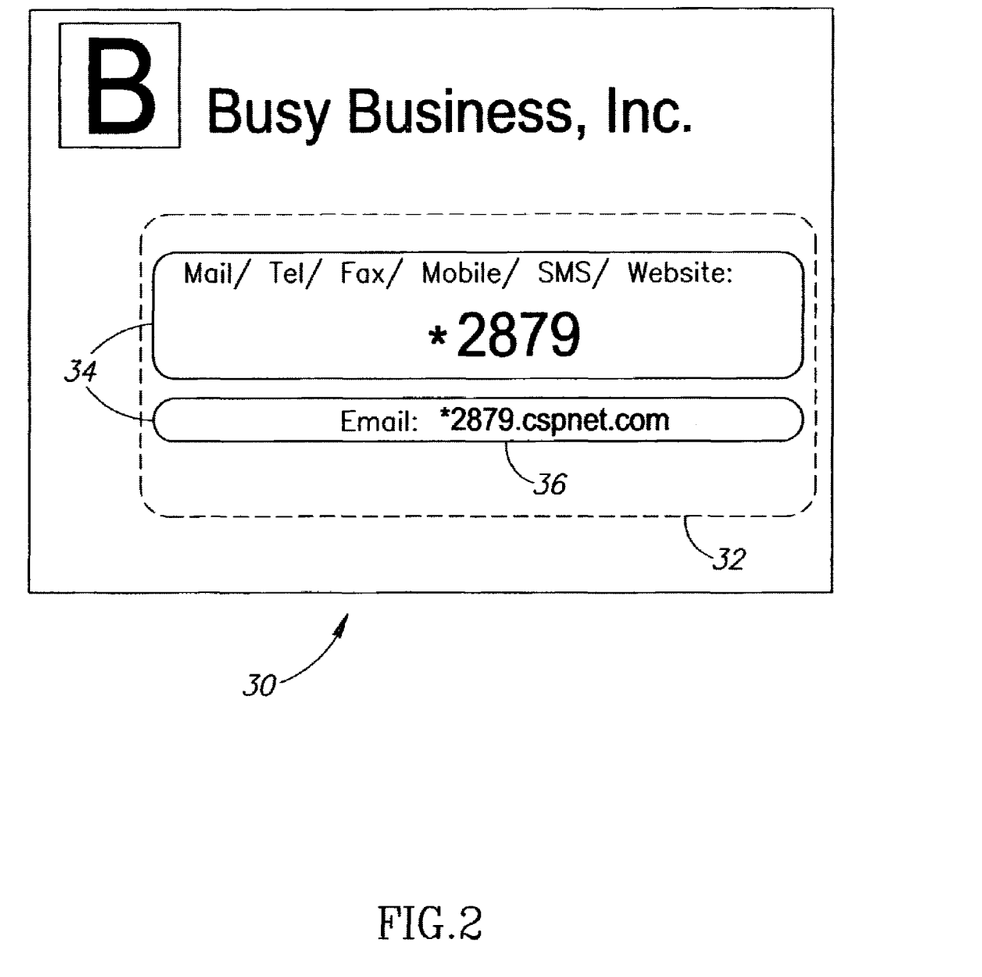
FIG. 2 is a demonstrative representation of the business card shown in FIG. 1, the contact details provided thereon have been compacted in accordance with the present invention.

FIG. 2, reference to which is now made, depicts a business card 30, which includes compact contact details 32 which may, in accordance with a preferred embodiment of the present invention, replace the full-length contact details 12 provided on prior art business card 10, while not detracting from the full range of communication versatility provided by full-length contact details 12. Compact contact details 32 may all contain as their single or chief component a "communications nickname" uniquely associated with one business. For example, the communications nickname for Busy Business Inc. may be "*2879".

As shown in FIG. 2, in accordance with the present invention, one simple, short and generally easily remembered number such as "*2879" may be substituted for nearly all of the disparate and lengthy contact details of a business. In the example shown in FIG. 2, the single contact detail "*2879" replaces the mailing address, phone number, fax number, text message number and website address of Busy Business, Inc. Some contact details, such as email address 36 shown in FIG. 2, may have a prefix or suffix appended to the communications nickname. In the case of compact contact details having prefixes or suffixes appended to the communications nickname, the communications nickname remains a unifying element between all of the compact contact details for a single business.

Compact contact details 32 for a business may comprise fewer communication access numbers (CANs) 34 than full-length contact details 12. For example, it is shown in a comparison between FIG. 1 and FIG. 2 that there may be a reduction from six CANs (indicated by reference numerals 12, 14, 16, 18, 20, 22 and 24) in full-length contact details 12 to two CANs in compact contact details 32.

Figure 3:
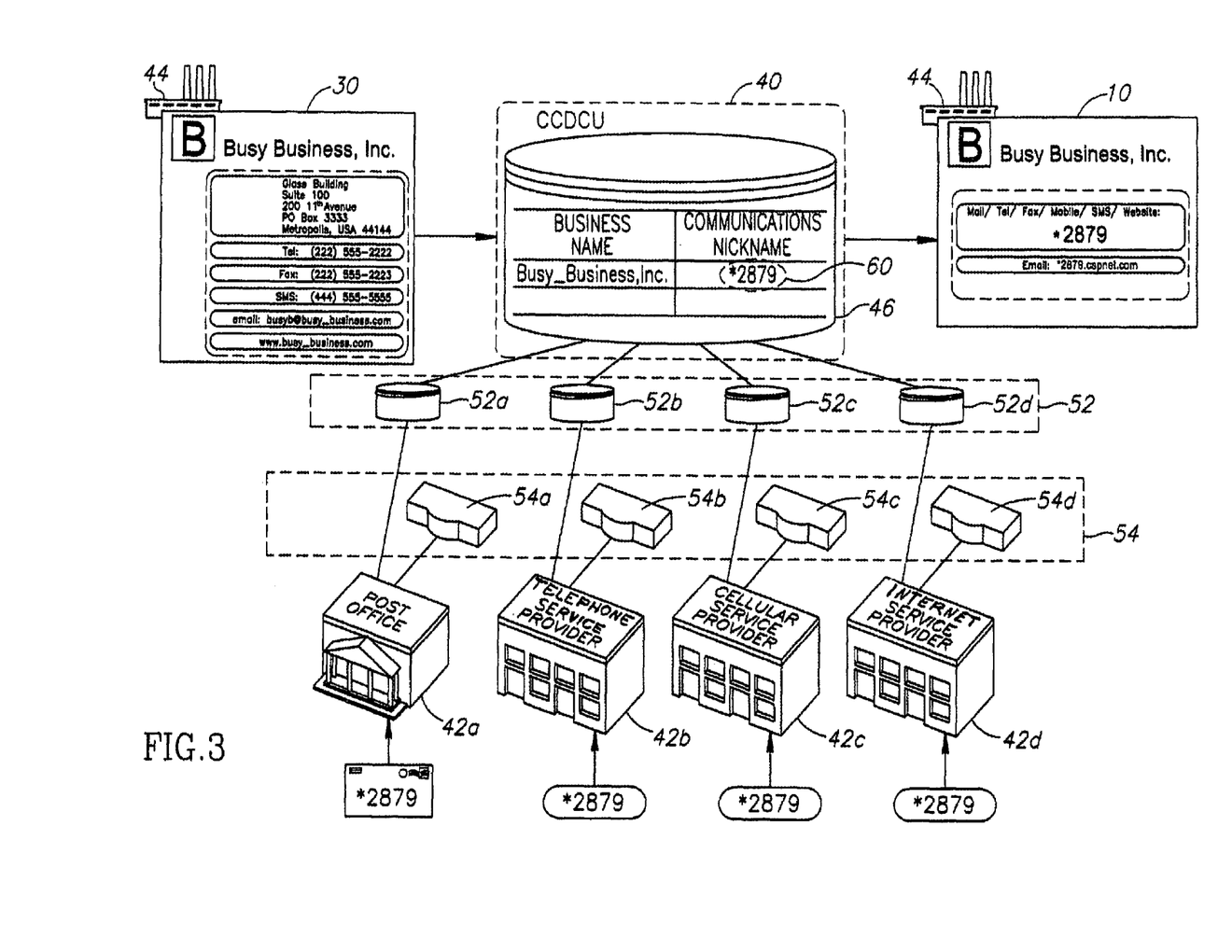
FIG. 3 is an illustration of a contact details management system constructed and operative in accordance with the present invention.

Reference is made to FIG. 3, which illustrates a compact contact details coordination unit (CCDCU) 40, operative in accordance with the present invention, in conjunction with multiple types of communications service providers (CSPs) 42.

CCDCU 40 may be employed to coordinate assignments of unique communications nicknames 60 to businesses 44. CCDCU 40 may comprise a database 46 in which an association between each business 44 and its assigned communications nickname 60 may be recorded.

Each communication service provider 42 may provide one type of communication service to businesses 44 and may, in accordance with the present invention, maintain and operate a database 52 and a router 54 for routing each unique communications nickname to its proper address. As shown in FIG. 3, exemplary CSPs 42 providing communications services to business 44 may include a post office 42*a*, one or more telephone service providers 42*b*, one or more cellular phone service providers 42*c* and one or more internet service provider 42*d*.

Each CSP 42 may operate and maintain a database 52 and a router 54. The data in each database 52 of each CSP 42 may include the names of the businesses served by the CSP, the full-length contact details assigned to each business by the CSP, and the compact contact details assigned to each business by the CSP.

Compact contact details coordination unit (CCDCU) 40 may coordinate the availability of communications nicknames for assignment to businesses 44 with CSPs 42. A unique communications nickname may be assigned to a business 44 when it is determined by CCDCU 40, through examination of all databases 52, that the nickname has not been assigned to any other business.

When a communication is initiated by a customer using a compact CAN, the CSP 42 handling the communication may employ its router 54 to route the communication to its correct destination according to the data stored in its database 52.

For example, as shown in FIG. 3, innovative CAN "*2879" may be associated with prior art address 14 of business 44 in the post office database, so that the post office may forward deliveries addressed to "*2879" to the Glass Building offices of business 44. Such forwarding may be through a mechanism similar to the mail forwarding mechanism currently available from post offices. Alternatively, post office 42*a* may have a more sophisticated method for collecting, delivering, forwarding and/or re-routing mail addressed to a communications nickname.

Telephone company 42*b* may route voice calls placed to "*2879" to telephone number 16. For facsimiles sent to CAN *2879, when telephone company 42*b* detects the sounds of a facsimile machine, it routes the phone call to fax number 18 for the business associated with *2879.

Cellular phone call carriers may similarly maintain databases to route calls received to innovative CANs. The routing of telephone calls of any kind may be according to existing call forwarding mechanisms. Alternatively, many telephony service providers include the ability to route "*xxxx" type phone numbers and thus, may utilize this option. Other mechanisms for routing CAN *2879 may also be available and are included in the present invention.

In accordance with the present invention, customers may also use the communications nickname "*2879" to contact business 44 by text message (SMS). The service provider for the text messages (e.g. a cellular telephone operator 42*c*, Internet service provider 42*d*) may route text messages addressed to compact contact access numbers to an account on an Internet server, such as one provided by Cellact of Raanana, Israel, where the text messages may be retrieved by business 44, or they may be forwarded to an account accessed on a computer located at business 44.

Customers may also type the communications nickname "*2879" into a web browser and may be routed to the website of business 44. An exemplary routing mechanism may be available through the combined operation of two applications, Netex of Israel and bweb.co.il of Israel. Netex may translate communications nicknames to the bweb.co.il website; and the bweb.co.il website, through its associated database 52, may translate input phone numbers, such as the communications nickname, to regular URLs, such as the actual website address of the company.

Customers may also send emails to business 44 at an address containing the communications nickname of business 44. As shown in FIG. 2, an email address for business 44 may include a domain name (i.e. "csp.com") in addition to its communications nickname. Emails addressed to "*2879.csp.com" may be forwarded by the server receiving these emails to a different email address designated by business 44. In a database 52 associated with the email server, each business 44 may be associated with its communication nickname, and the forwarding email address for business 44.

Figure 4:
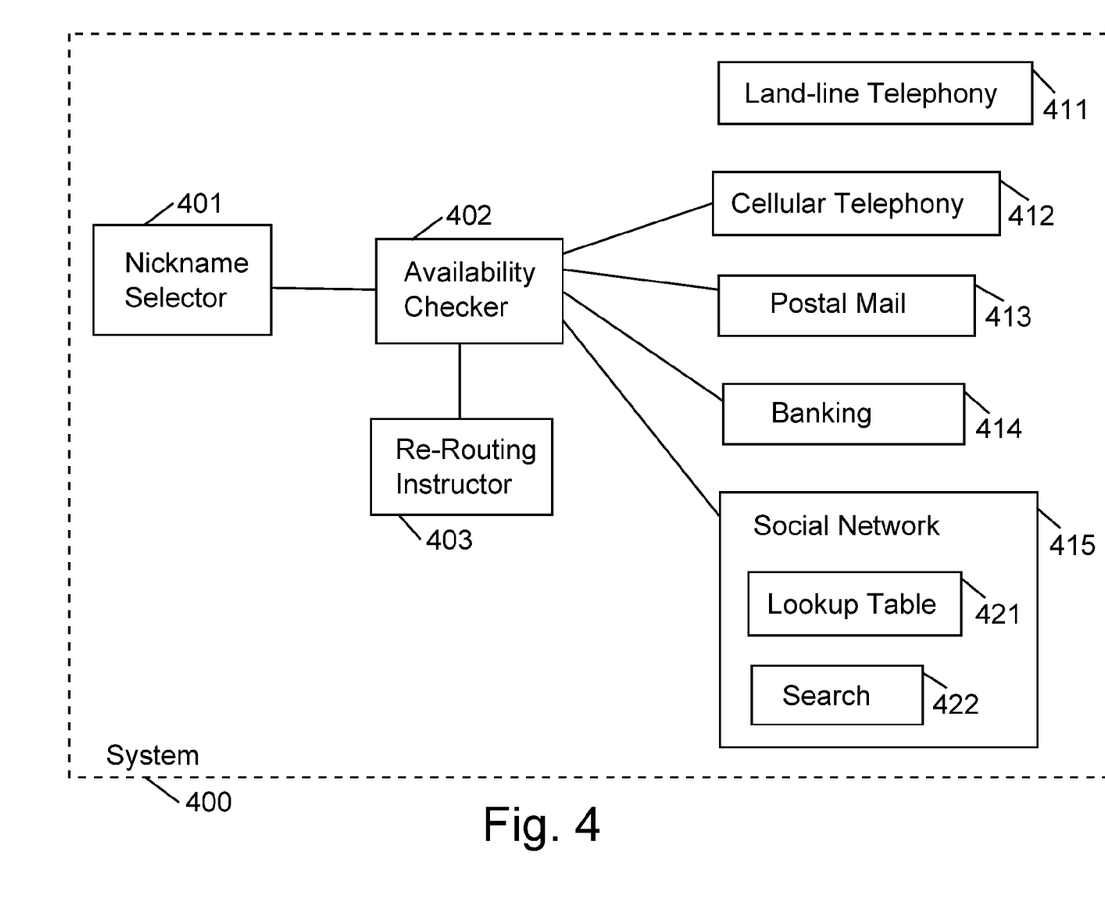
FIG. 4 is a schematic block-diagram illustration of a system in accordance with the present invention.

Reference is made to FIG. 4, which is a schematic block-diagram illustration of a system 400 in accordance with the present invention.

System 400 may comprise, for example, a nickname selector 401, an availability checker 402, a re-routing instructor 403 and multiple service providers 411-415.

Nickname selector 401 may define a candidate unique nickname to be associated with an entity (e.g., a corporate entity, a person, or the like). The candidate nickname may be, for example, a unique string of characters (e.g., numeric, or alpha-numeric), which may optionally comprise a prefix or a suffix, for example, "*" or "#" or other suitable character which may not necessarily be alpha-numeric.

Nickname selector 401 may utilize availability checker 402, in order to check whether or not the candidate nickname is available across multiple service providers and/or across multiple communication service providers and/or across multiple routes of communication. Such demonstrative providers or routes may comprise, for example, a landline telephony service provider 411, a cellular telephony service provider 412, a postal mail provider 413 (e.g., a post office system for delivery of physical mail, letters and/or packages), a banking service provider 414 (e.g., a bank, a brokerage firm, or financial institution), a social network service 415 or website (e.g., Facebook, Twitter, LinkedIn, YouTube), or the like. Other suitable service providers or communication routes may be used and/or queried, for example, facsimile (fax) communications, Short Message Service (SMS) communication or "text" messaging, Multimedia Messaging Service (MMS), electronic mail (email), Instant Messaging (IM), video conference nickname (e.g., for Skype or FaceTime, video conference or video chat using Wi-Fi wireless communication and/or using 3G cellular communication or 4G cellular communication or 4G LTE cellular communication), or the like.

For example, availability checker 402 may check whether or not a candidate nickname "*5678" is available to be registered with landline telephone service provider 411 and/or with cellular telephone service provider 412 as a unique nickname for "Busy Business Inc." ("BBI"), that will allow a user to contact BBI via telephone, by placing a call from a landline telephone or from a cellular telephone to that nickname.

Optionally, availability checker 402 may check whether or not the candidate nickname "*5678" is available to be registered with postal service provider 413 as a unique nickname of BBI, that will allow a user to send postal mail to BBI by addressing a letter or a package to that nickname; such that the postal mail will be automatically routed or re-routed by the post office, and physically delivered, to BBI.

Optionally, availability checker 402 may check whether or not the candidate nickname "*5678" is available to be registered as a unique nickname of BBI that will allow a user to deposit cash, checks, or make payments to the benefit of BBI, such that banking service provider 414 may identify BBI and its relevant bank account based on the unique name, and may accomplish the user-requested banking transaction towards that bank account of BBI.

Optionally, availability checker 402 may check with social network service 415 whether or not the candidate nickname "*5678" is available to be registered as a unique nickname of BBI that will allow a user to rapidly and/or directly access a social networking page or a social networking profile or a social networking homepage of BBI.

Availability checker 402 may check the availability of multiple candidate nicknames, that nickname selector 401 may generate or may suggest, across multiple routes of communications or across multiple services that are desired by the entity (e.g., BBI) that attempts to register the unique nickname for its benefit and such that customers and third parties may be able to easily access it.

Once an available nickname is found, re-routing instructor 403 may notify one or more (or all) of providers 411-415 that the unique nickname is to be associated with the entity (BBI); and may send to providers 411-415 data indicating the actual (non-abbreviated) contact details of the entity, with a request or command to modify or program any router(s) and/or lookup table(s) and/or databases of service provider(s) 411-415 to enable re-routing to those actual contact details if a user (e.g., a customer) utilizes the unique nickname.

In some implementations, social network service 415 may comprise a lookup table 421 which may be created, modified and/or configured to enable users of social network service 415 to directly access a page or profile of BBI on social network service 415, by typing or searching for the unique nickname ("*5678") associated with BBI. For example, lookup table 421 may be updated to reflect that any search, performed at social network service 415, for the string "*5678", would return as the first result a hyperlink or a shortcut to the social networking profile or to the social networking page of BBI on social network service 415. Alternatively, lookup table 421 may be updated to reflect that any search, performed at social network service 415, for the string "*5678", would cause an automatic redirect of the user to the social networking profile or to the social networking page of BBI on social network service 415. Optionally, a search function 422 of social network service 415 may be modified or configured, to begin each search by looking up in lookup table 421, or to include a lookup into lookup table 421 within each search, and/or to automatically redirect the user to the social networking page of BBI on social network service 415 if the search query is (or includes) the unique nickname.

In some implementations, a computerized method may comprise, for example: (a) defining a unique string of characters as a unique nickname for a business entity; (b) configuring a system of a communication service provider to enable a user of an electronic device to contact the business entity via the communication service provider by addressing the unique nickname, wherein the communication service provider is selected from the group consisting of: land-line telephony, cellular telephony, electronic mail, Internet website, SMS message or "texting" message, video conference or video chat, or the like; (c) configuring a system of a social network to enable the user to directly reach a page of the business entity on the social network by entering the unique nickname (e.g., as a search query string) on the social network.

Figure 5A:
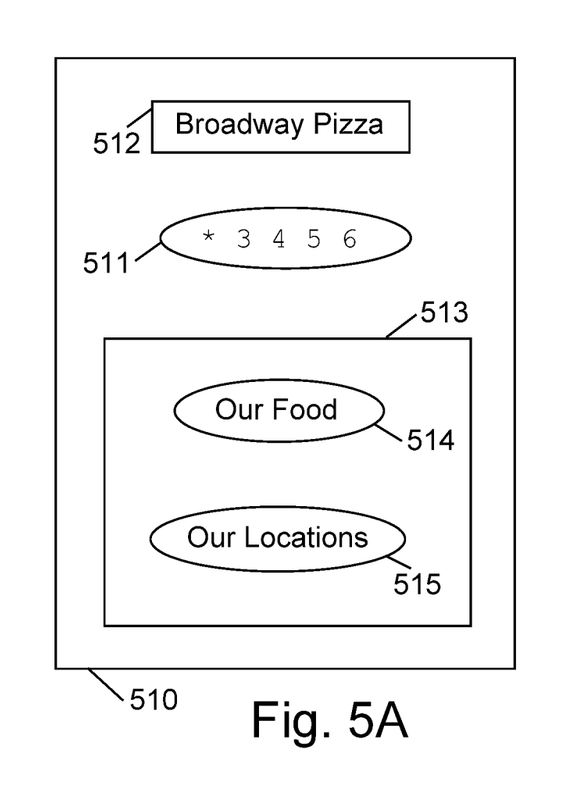
FIGS. 5A-5B are schematic illustrations of user interface of an application for an electronic device, in accordance with the present invention.
Figure 5B:
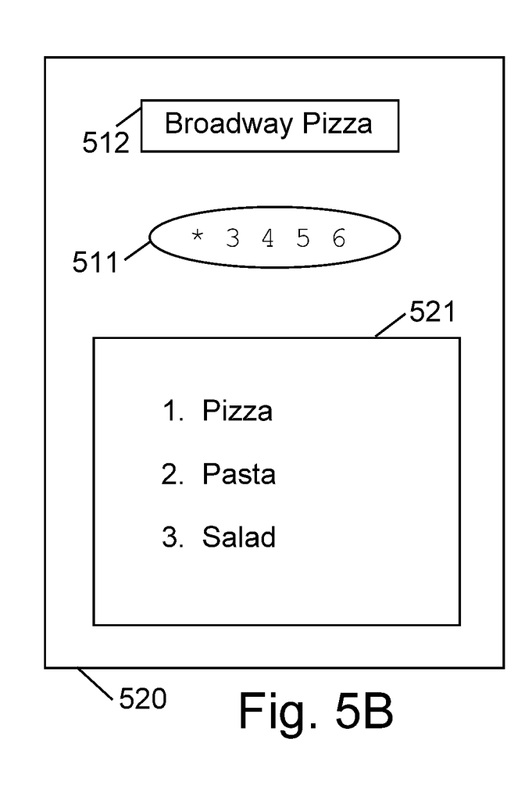

Reference is made to FIGS. 5A-5B, which are schematic illustrations of user interface of an application for an electronic device, in accordance with the present invention. As a demonstrative example, the application may be produced by, or for, a pizza store named "Broadway Pizza", and may run on a smartphone, a tablet, a laptop computer, or other suitable computing device or portable electronic device.

FIG. 5A demonstrates a home page 510, which may comprise, for example, a nickname button 511, a logo 512, and a home page content 513 including multiple elements 514-515.

Nickname button 511 may display a unique nickname (e.g., "*3456", or "#8463", or "*YKTR", or "#CAKE", or the like) which may be uniquely associated with the entity "Broadway Pizza". In some implementations, nickname button 511 may be displayed in all the pages or screens of the application; and optionally, may be displayed at the same location in all the pages or screens of the application.

In accordance with the present invention, a click or tap on nickname button 511, or other user input indicating user selection of nickname button, may cause the application to initiate a communication with "Broadway Pizza" via one or more pre-defined routes of communication, for example, a voice telephone call, an email message, a SMS message, a chat application or module, a video conference or video chat, or the like.

FIG. 5B demonstrates another page 520 of the application, showing that nickname button 511 remains shown to the user, even though a different content 521 is shown together with it.

Figure 6:
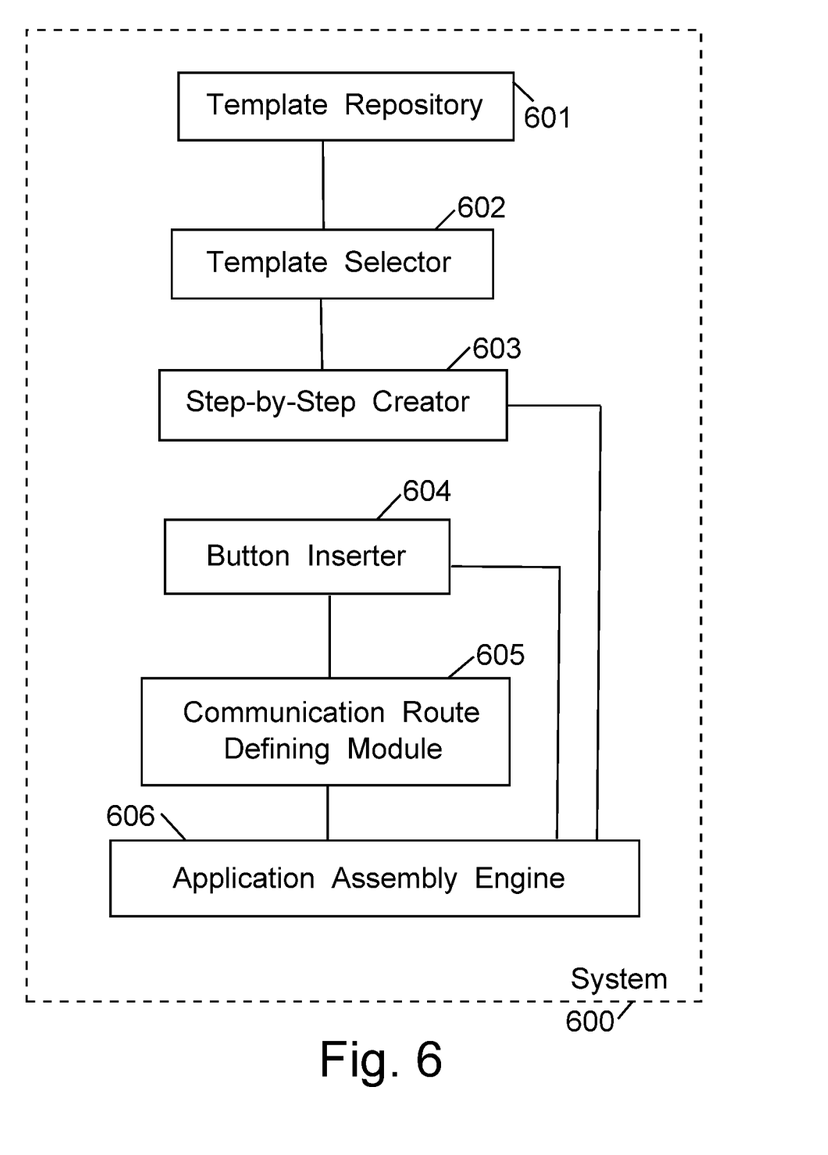
FIG. 6 is a schematic block diagram illustration of a computerized system for creating an application for an electronic device, in accordance with the present invention.

Reference is made to FIG. 6, which is a schematic block diagram illustration of a computerized system 600 for creating an application for an electronic device, in accordance with the present invention. System 600 may be used, for example, to create the application demonstrated in FIGS. 5A-5B.

System 600 may comprise, for example, a template repository 601, a template selector 602, a step-by-step creator module 603, a button inserter 604, a communication route defining module 605, and an application assembly engine 606.

Template repository 601 may comprise, for example, one or more pre-defined templates of applications. Each template may be suitable to a particular type of business (e.g., restaurant; retailer; banking; or the like). Each template may comprise one or more fields or placeholders, into which text may be inserted, or into which other elements or objects (e.g., graphics, videos, animation) may be inserted. Each template may further comprise one or more routines, sub-routines, functions, code objects, scripts, or other code portions, which may be assembled together and/or modified and/or compiled and/or put in order, in order to generate a working application ("app") based on the template and based on user input; this may be performed, for example, by application assembly engine 606 which may compile and "publish" the application, e.g., as a stand-alone application.

Template selector 602 may comprise a module allowing a user (e.g., a manager of "Broadway Pizza") to select a template from template repository 601. Optionally, template selector 602 may present to the user one or more questions in order to recognize the type of business, and template selector 602 may then suggest to the user one or more suitable template(s).

Step-by-step creator module 603 may comprise a "wizard" type of generator module, able to present to the user a series of questions; to receive user responses; and to insert the user responses to suitable fields or placeholders in pre-defined template(s). For example, step-by-step creator module 603 may ask the user to provide the name of the business, and may then insert the user response into the relevant field(s) in the selected template. Optionally, the user may be able to drag-and-drop text and/or multimedia files (e.g., pictures, videos) into pre-defined places or placeholders in the selected template.

Step-by-step creator module 603 may invoke nickname button inserter 604, which may insert into one or more (or all) of the pages in the template a user interface element (e.g., a button) which, when clicked or tapped or otherwise selected by an end-user of the application, will cause the application to initiate a communication with the entity associated with the application.

Button inserter 604 may operate in coordination with communication route defining module 605, which may define or configure the particular type of communication route that is initiated when the nickname button is clicked, tapped or otherwise selected. In a demonstrative example, communication route defining module 605 may insert code which causes the device, on which the application may run, to initiate a telephone call to the nickname that is inserted by button inserter 604. In another example, communication route defining module 605 may insert code which causes the device, on which the application may run, to send out a text (SMS) message to the nickname that is inserted by button inserter 604.

It is noted that the communication route that is initiated from the application, may actually comprise two or more communication routes which may be switched or linked along the route to and/or from the business entity. In a demonstrative example, communication route defining module 605 may insert code which causes the electronic device to send out a text (SMS) message to the business entity; then, at a communications hub of the business entity, a converter module may convert the incoming text (SMS) message into another format (e.g., an email, or on-screen text within a customer service application), may obtain feedback from a customer service representative (e.g., via email, via an on-screen application, or the like), and may convert the feedback into the desired format that may then be routed to the end-user via the same communication route that the end-user chose to submit his initial query. Accordingly, an end-user that used the button to send out an SMS, may receive back a response in the format of an SMS too; whereas, an end-user that used the button to send out an email, may receive back a response in an email format. One or more converter modules, re-routing modules and/or formatting modules may be used.

In some implementations, each template may initially comprise source code that enables multiple routes of communication between the application being created and the destination entity (e.g., BBI); and the step-by-step creator module 603 may ask the user, interactively, which communication route(s) to enable and which communication route(s) to disable. The communication route(s) that the user selected, may be reflected in the application as one or more buttons or links or other elements of user interface.

Optionally, the step-by-step creator module 603 may allow a user to fill-in text in pre-defined fields; to upload images or videos; to select layout, colors, font type, font size; to select animation effects or transition effects; or other features of the application being composed. Optionally, the step-by-step creator module 603 may allow a user to select which pages, out of a preset batch of pages (e.g., an "About Us" page; a "F.A.Q." page; a "Driving Directions" page), are to be included in (or excluded from) the application being composed. Accordingly, application assembly engine 606 may remove such pages or may add such pages, to the application being composed, by inserting or removing portions of the code associated with the selected template.

In a demonstrative implementation, a method may comprise: (a) defining a unique string of characters as a unique nickname for a business entity; (b) providing a smartphone application in which substantially all screens comprise a user interface element showing the unique nickname; (c) receiving a user selection of the user interface element; and (d) in response to the user selection, causing the smartphone to initiate a telephone call (or a text/SMS message) to the business entity.

Figure 7:
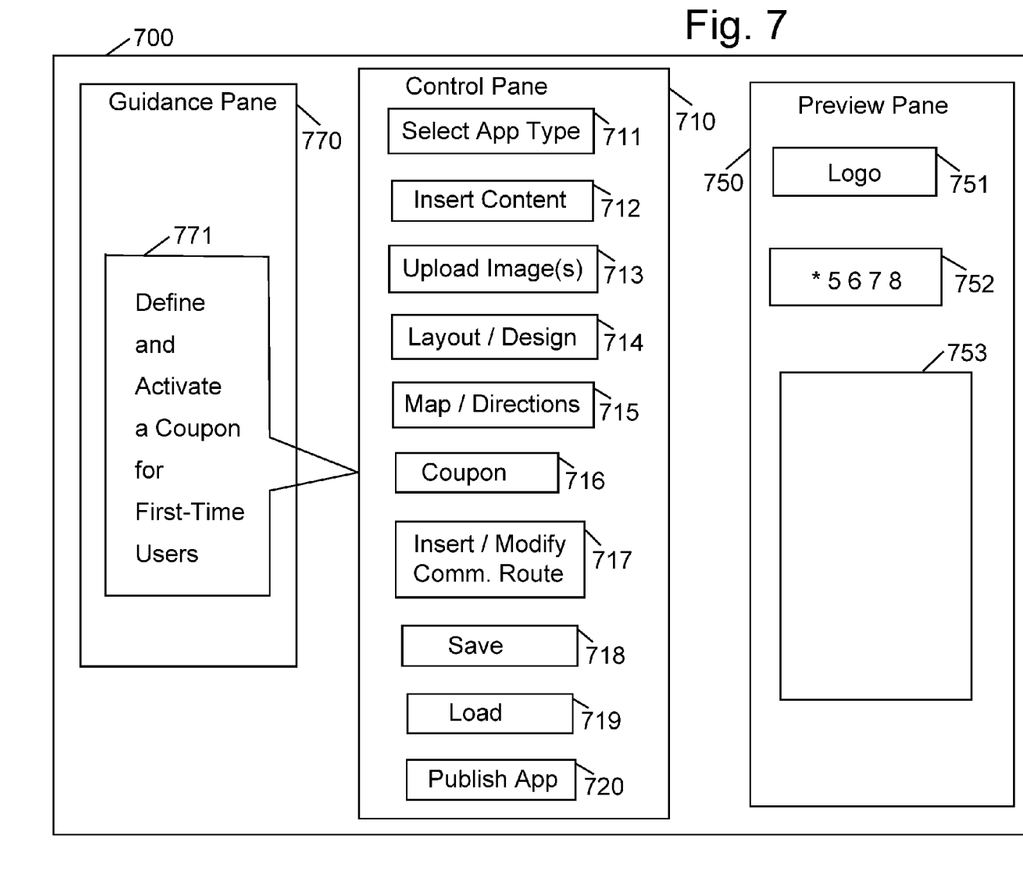
FIG. 7 is a schematic illustration of a screen of a system for assembling applications, in accordance with the present invention.

Reference is made to FIG. 7, which is a schematic illustration of a screen 700 of a system for assembling applications, in accordance with the present invention. Screen 700 may have multiple panes or windows, for example, a control pane 710, a preview pane 750, and optionally a guidance pane 770.

Control pane 710 may comprise one or more buttons, links, or other User Interface (UI) elements 711-720 allowing the user to interactively compose an application by using a step-by-step "wizard"-type generator module. Guidance pane 770 may provide guidance, help, instructions and/or advice to the user, with regard to one or more options that are available to the user at control pane 710. Preview pane 750 may interactively display, in a dynamic manner, the changes to the application as they are being set, configured or modified by the user who interacts with the control pane 710.

In a demonstrative example, control pane 710 may comprise multiple UI elements 711-720; guidance pane 770 shows an exemplary operation-specific guidance item 771; whereas preview pane 750 shows a logo 751, a nickname button 752 (e.g., triggering a phone call or SMS message or email to a destination entity), and a content area 753 which may dynamically modify in response to user interaction with control pane 710.

For example, a "select application type" button 711 may allow a user to select the type of application to be composed (e.g., an application for a restaurant; an application for a hotel; an application for a financial institution).

An "insert content" button 712 may allow the user to insert content, upload content, fill-in content, or otherwise select content, to be inserted into pre-defined fields or placeholders that may be pre-defined in the template of the application being composed. This may be performed across multiple screens, prompting the user to enter a particular data item on each screen.

An "upload image(s)" button 713 may allow the user to upload, or otherwise provide or send, image(s) and/or other content items (e.g., videos) which may be presented in particular pages of the application.

A "layout/design" button 714 may allow the user to set of modify the layout and/or design of the application being composed; for example, by setting or modifying font type, font size, font color, background color(s), animation effects, transition effects, audio prompts, or the like.

A "map/directions" button 715 may allow the user to add, to one or more pages in the application being composed, a map of one or more locations (e.g., branches of the business entity), and/or driving directions to such location(s).

A "coupon" button 716 may allow the user to define a promotional coupon that the application may display to end-users, as well as the conditions for displaying such coupons (e.g., particular days; particular time-slots; upon first use of the application; upon repeated usage of the application; or the like) and the coupon content (e.g., whether the end-user receives a discount from the price, or a free promotional item, or the like). The user may further toggle or otherwise select, whether the coupon is enabled or disabled, or to define an expiration date for such coupon.

An "insert/modify communication route" button 717 may allow a user to insert one or more buttons that will appear in the application (e.g., in some or in all pages of the application), and will cause the electronic device on which the application runs, to contact the destination entity via one or more pre-defined communication routes (e.g., SMS, email, telephone, cellular telephone, landline telephony, video chat or video conference, or the like).

A "save" button 718 may allow a user to save his settings, or to save the definitions that the user defined so far for the application being composed. A "load" button 719 may allow the user to load, or to open, a previously-saved project of composing an application.

A "publish application" button 720 may allow the user to command the application assembly system to assemble and/or compile the application, based on the content that the user inserted and based on the settings that the user selected and/or configured.

Preview pane 750 may interactively update its content, to reflect how the application may change its appearance in response to settings and/or modifications that the user performs via control pane 710.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine (e.g., a computer or an electronic device) to perform a method and/or operations described herein.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A system for creating an application for a portable electronic device to enable the device to contact a third party via a communication method, the system including a processor and a memory, said system comprising:
   a template selector to select an application template from a repository of application templates for applications to operate on portable electronic devices, each template comprising one or more placeholders to receive text or other objects and one or more selectable code portions;
   a step-by-step creator module to interactively guide a user to create the application from the selected application template at least by selecting relevant ones of said selectable code portions and by defining said communication method;

a button inserter to insert code associated with a displayed button into said created application, said code to cause the portable electronic device to contact the third party using said defined communication method upon user selection of said displayed button; and an application assembly engine to assemble said application based on said template and based on user input received by said step-by-step creator module, wherein the application assembly engine comprises:

a control pane to receive user commands and user settings for said application being composed;

a preview pane to dynamically display a preview of said application reflecting said user commands and user settings; and a coupon insertion module to insert to said application code which, when executed by the portable electronic device, causes the portable electronic device to display an on-screen coupon.

2. The system of claim 1, wherein the communication method comprises a communication method selected from the group consisting of:

landline telephony, cellular telephony, Short Message Service (SMS), video chat, and electronic mail (email).

3. The system of claim 1, wherein the button displays a compact contact detail of said third party.

4. The system of claim 3, wherein the communication method comprises a communication method directed at said compact contact detail.

5. The system of claim 1, wherein the button inserter is operable to insert said displayed button into all screens of said application.

6. The system of claim 1, wherein the control pane comprises user interface elements selected from the group consisting of:

a user interface element for receiving a user-entered text;

a user interface element for receiving a user-uploaded image; and a user interface element for modifying a layout of said application.

7. A computerized method for implementing an application to enable a portable electronic device to contact a third party via a predefined communication method, the computerized method comprising:

selecting, by a processor, an application template from a repository of application templates for applications to operate on portable electronic devices, each template comprising one or more placeholders to receive text or other objects and one or more selectable code portions;

step-by-step guiding, by the processor, a user to create the application from the selected application template at least by selecting relevant ones of the selectable code portions and by defining the communication method;

inserting, by the processor, code associated with a displayed button into the created application, the code to cause the portable electronic device to contact the third party using the defined communication method upon user selection of the displayed button; and assembling, by the processor, the application based on the template and based on user input during said step-by-step guiding, wherein assembling the application comprises:

receiving user commands and user settings for the application being composed, dynamically displaying a preview of the application reflecting the user commands and user settings, and inserting to the application code which, when executed by the portable electronic device, causes the portable electronic device to display an on-screen coupon.

8. The method of claim 7, wherein the pre-defined communication method comprises a communication method selected from the group consisting of:

landline telephony, cellular telephone, Short Message Service (SMS), video chat, and electronic mail (email).

9. The method of claim 7, wherein the users-selectable button element comprises an on-screen button which displays a compact contact detail of said third party.

10. The method of claim 7, comprising:

receiving from said user a message sent via said pre-defined communication method;

delivering said message to said third party;

receiving from said third party a response message directed to said user; and delivering said response message to said user via said pre-defined communication method.

11. The method of claim 7, comprising:

receiving from said user a message sent via said pre-defined communication method; and delivering said message to said third party via another communication method.

12. The method of claim 11, further comprising:

receiving from said third party a response message directed to said user; and delivering said response message to said user via said pre-defined communication method.

* * * * *